United States Patent Office 2,972,643
Patented Feb. 21, 1961

2,972,643

PREPARATION OF AROMATICS FROM ALIPHATIC OLEFINIC HYDROCARBONS CONTAINING FROM 2 TO 7 CARBON ATOMS PER MOLECULE

Charles Newton Kimberlin, Jr., and William Judson Mattox, both of Baton Rouge, La., assignors to Esso Research and Engineering Company, a corporation of Delaware No Drawing. Filed May 1, 1957, Ser. No. 656,183

9 Claims. (Cl. 260—673)

The present invention pertains to the conversion of hydrocarbons and more particularly to a process for the conversion of olefinic hydrocarbons into aromatics.

The production of aromatic hydrocarbons has become extremely important in recent years in view of the demands thereof as solvents, as chemical intermediates, and as components in high octane number motor gasolines. Although large quantities of aromatics are currently being produced by coal distillation and especially by the hydroforming of petroleum naphthas, the demand for aromatics still exceeds the supply. Accordingly, there is a definite need for new sources of aromatics and new or improved methods of preparing aromatics.

It is the object of this invention to provide the art with a novel method for producing aromatics.

It is also the object of this invention to provide the art with a novel method for converting olefinic hydrocarbons into aromatics.

It is a further object of this invention to provide the art with a simple, effective method for converting low molecular weight or $C_2$ to $C_7$ olefins into lower boiling aromatics as well as higher boiling olefins into high molecular weight aromatics.

These and other objects will appear more clearly from the detailed specification and claims which follow.

It has now been found that olefinic hydrocarbons may be converted to aromatics simply and effectively by contacting the same with a crystalline alumino silicate at temperatures of about 350° to 850° F. The preferred alumino silicates have a high surface area of about 200 to about 700 square meters per gram, and have pore openings not less than about 6 A. and varying up to about 15 A. The alumino-silicates may be used in the usually available sodium, potassium or calcium forms, or they may be ion exchanged with salts of chromium, molybdenum, nickel, cobalt, zinc, vanadium, or other metals which promote the formation of aromatics.

It has been known for sometime that certain natural zeolites, such as chabazites, and analcite and the like, have the property of selectively adsorbing normal hydrocarbons and rejecting the branch chain isomers. These zeolites have crystal patterns forming structures containing a large number of small cavities interconnected with a number of still smaller holes or pores. These pores are of exceptional uniformity of size and diameter. Only molecules small enough to enter the pores can be adsorbed. The pores may vary from less than 3 to more than 15 A. in diameter, but for any one zeolite, the pores are of substantially uniform size.

The patent and scientific literature contains numerous references to the adsorbing action of natural and synthetic zeolites. Thus, synthetic zeolites have been described, for instance, by Barrer U.S. Patent 2,306,610 and Black U.S. Patent 2,442,191. Zeolites, both natural and synthetic, vary considerably in composition, but most generally contain silicon, aluminum, oxygen, and an alkali and/or alkaline earth metal element, e.g., sodium, potassium, and/or calcium, magnesium, etc. Analcite has the empirical formula $NaAlSi_2O_6.H_2O$ which on treatment with $Ca++$ and subsequent dehydration, is converted to the molecular sieve material, $$CaNa_2Al_2Si_4O_{12}$$

Black U.S. Patent 2,442,191 describes a synthetic zeolite with molecular sieve properties having the empirical formula $4CaO.Al_2O_3.4SiO_2$. Further description of these zeolites is found in the article entitled "Molecular Sieve Action of Solids" in Quarterly Reviews, vol. III, pages 293 to 330 (1949), published by the Chemical Society (London).

The naturally occurring zeolites having selective adsorptive properties for hydrocarbons do not occur abundantly in nature and are expensive. Efforts in the past have been made to supply this deficiency by synthesis of compositions having such adsorptive properties. Though the preparation of zeolites has long been known, only a few have structures and crystal lattice patterns allowing the selective adsorption of straight chain hydrocarbon components from mixtures with branched chain isomers or the selective adsorption of aromatic components from hydrocarbon streams. It has been proposed to make adsorbents from silica gel and alumina-containing compounds such as the aluminates, or from water glass and sodium aluminate. Barrer, U.S. Patent 2,413,134, describes the formation of gels by interaction of water glass and sodium aluminate solutions. These gels are gradually converted into crystalline materials on heating in aqueous or alkaline suspensions for about 24 hours at 392° F. The materials thus formed adsorb normal paraffins but the pores are too small for aromatic molecules to enter. Such a process is of little value commercially because of the long reaction period at very high temperatures requiring super-atmospheric pressures in order to convert the gels into the desired crystalline material.

High yields of crystalline alumino-silicates having large pores can be obtained by vigorously intermixing, under carefully controlled conditions, of certain forms of sodium silicate and sodium aluminate in certain proportions followed by heat aging under relatively mild conditions to develop the desired crystalline form. The crystalline alumino-silicate is then separated from the reaction solution as by filtration and then washed with water, dried and activated by calcining. If desired, the alumino silicate may be ion exchanged before or after drying by contacting the same with an aqueous solution of the desired metal salt.

In order to obtain substantially instantaneous production of crystals it is essential to employ as one reactant a sodium silicate having a high ratio of soda to silica, i.e., at least 0.8/1 and possibly as high as 2/1. The preferred ratio of soda to silica is 1/1 and the preferred reagent is sodium metasilicate. The concentration of the sodium silicate may be in the range of about 30 to 300 grams of $SiO_2$ per liter, preferably about 100 to 200 grams per liter.

The composition of the sodium aluminate is less critical than that of the sodium silicate. Sodium aluminate having a ratio of soda to alumina in the range of 1/1 to 3/1 may be employed, but it is preferred to use those sodium aluminates having a relatively high ratio, say 1.5/1 soda to alumina ratio. The sodium aluminate concentration may be in the range of from about 40 to 400 grams $Al_2O_3$ per liter, and preferably is about 200 to 300 grams per liter.

The amount of sodium silicate and sodium aluminate solution used should be such that the ratio of silica to alumina in the final mixture is in the range of 3/1 to 10/1, preferably about 4/1 to 6/1. The mixing is ordinarily effected at ambient temperatures and should be rapid and efficient as in the impeller zone of a centrifugal pump.

The mixture is thereupon passed to a heater zone and heated to about 180° to 250° F. or more. During the time of passage through the heated zone, the reaction slurry undergoes crystallization to give the desired structure. At about 210° F. crystal formation is completed in about 3 to 24 hours. At higher temperatures shorter times are required for completion of the crystal formation, while at lower temperatures, somewhat longer time periods are required. After crystal formation of the precipitated sodium alumino-silicate has been completed, the reaction mixture is filtered and the alumino-silicate washed free of soluble materials by means of water. The material may then be dried as by heating to about 250° F. and then activated by calcination at temperatures in the range of 400° to 1000° F., preferably at about 700° to 900° F.

The physical and/or catalytic properties of the alumino-silicates may then be modified by base exchanging at least part of the sodium ions in the sodium alumino silicate with other ions. For this purpose, solutions of calcium or magnesium salts may be utilized or, if it is desired to further increase the catalytic activity or vary the pore opening, the zeolite can be impregnated or base exchanged with salts of chromium, molybdenum, nickel, cobalt, zinc, vanadium, zirconium, tungsten, or other metals which also promote the formation of aromatics.

Various ion exchanged alumino-silicates are conveniently prepared from water soluble salts such as $CrCl_2$, $NiCl_2$, $CoCl_2$, $CaCl_2$, $ZnCl_2$, $MgSO_4$, etc., by the following general procedure. Four hundred grams of zinc chloride (or sulfate) is dissolved in 1500 cc. of water. To this solution (at about 80°–100° F.) 500 grams of the dry sodium alumino-silicate is added slowly with stirring. Occasional agitation is continued for about two hours. The liquid layer is then decanted, the alumino-silicate washed twice with distilled water, and a fresh solution of $ZnCl_2$ (400 grams/1500 cc. $H_2O$) added and allowed to stand, with occasional shaking, in contact with the adsorbent for 2 to 4 hours. The aqueous layer is decanted and the adsorbent washed with distilled water until the wash water is free of soluble salts. The adsorbent is then dried in an oven at 225°–250° F. and then calcined at 850° F. for two hours. This procedure is adaptable to a number of variations, such as the use of alcohol-water solvents, etc. to increase the solubility of certain salts.

Olefins suitable for conversion to aromatics by the use of metallo-alumino-silicate catalysts will comprise a wide variety of unsaturated aliphatics, including olefins, diolefins, and acetylenes. These olefins or olefin-containing feeds may vary greatly in boiling range but in general lower boiling aromatics will be produced from light hydrocarbons such as those containing $C_2$ to $C_5$ carbon atoms. With higher boiling feeds very high molecular weight aromatics will be produced.

The reaction may be carried out at atmospheric pressure, although somewhat elevated pressures will usually be advantageous but preferably below about 750 p.s.i.g. Temperatures of about 350 to 850° F. will usually be suitable and in most instances a preferred range is about 400° to 700° F. Within these ranges of temperature and pressure, feed rates measured as w.hr./w. may vary from about 0.05 to about 5 depending upon the olefinicity of the feed, catalyst activity, and the desired level of conversion. Since the catalyst employed in these conversions is also a strong adsorbent for the aromatics produced, it will usually be preferred, in fixed-bed operations, to periodically interrupt the feed and recover the aromatics by suitable desorption, such as steaming followed by air-blowing to re-dry, evacuation, purging with suitable gas or vapor at elevated temperature. In fluid-type operations the desorption can be made continuous by circulating a portion of the catalyst-adsorbent through a separate vessel in which the desorption is effected under suitable conditions.

The following examples illustrate the employment of crystalline metallo-alumino-silicates as catalysts for conversion of unsaturated hydrocarbons to aromatics in the manner described above.

EXAMPLE I

Normal pentene (92%) was vaporized and passed at atmospheric pressure and a feed rate of 0.06 vol./vol. of catalyst/hour into a fixed bed of sodium-alumino-silicate ($Na_2O.2.5Al_2O_3.SiO_2$) maintained at a temperature of 400° F. The sodium alumino-silicate is prepared as follows: A solution comprising 435 grams of commercial sodium metasilicate (29.1% $Na_2O$ and 28.7% $SiO_2$) and 1305 cc. of water are placed in a 4 liter vessel. To this are added at room temperature and with rapid and efficient stirring 265 grams of a sodium aluminate solution (20 wt. percent $Al_2O_3$ and $3Na_2O.2Al_2O_3$ mol ratio). After stirring for 5 minutes an additional 1000 cc. of water are added and heated under reflux conditions for a total time of 240 hours. The crystalline material was filtered, washed well with water, and dried in an oven at 250° F. and finally calcined at 850° F. for four hours. This synthetic zeolite or molecular sieve material has uniform pore openings of about 13 angstrom units. Initially, all hydrocarbon feed and reaction products were adsorbed but as the catalyst-adsorbent became saturated the first portions of effluent comprised n-pentane, present in small quantities in the feed. The next material to appear in the effluent was n-pentene and after 0.2 vol./100 vols. of catalyst the effluent had a composition approximately the same as that of the feed. After 11 volumes of pentene/100 vols. of catalyst had been fed, the operation was interrupted and the hydrocarbons recovered from the catalyst by steam desorption at 400° F. Analysis of the hydrocarbon product showed 38.2% unconverted pentene and 61.8% of aromatics and higher boiling non-aromatics based on the pentene fed. Of the material converted, 72.8% comprised an intermediate fraction (boiling range, 104°–347° F.) of aromatics and non-aromatics (specific gravity, 0.703 to 0.759) and 27.2% of aromatic concentrate boiling above 347° F. (specific gravity 0.804 to 0.838).

EXAMPLE II

In an operation similar to that of Example I employing the same feed, catalyst, temperature, feed rate, and pressure, pentene was charged to the fixed-bed of catalyst until the effluent amounted to 28 volts./100 vols. of catalyst. Conversion to $C_6+$ hydrocarbons amounted to 18.2% and of the converted material 80.9% comprised an intermediate fraction of aromatics and non-aromatics (refractive index 1.4260) and 19.1% of aromatic concentrate (refractive index, 1.4935; benzene=1.4979). The intermediate fraction would be suitable for recycle to yield additional quantities of cyclic hydrocarbons.

EXAMPLE III

Normal hexene was vaporized and passed at atmospheric pressure into a fixed-bed of sodium-alumino silicate ($Na_2O.2.5Al_2O_3.SiO_2$) at temperatures of 245° and 400° F. and with various amounts of the olefinic feed. The following tabulation summarizes the effects of these variables on the production of aromatic concentrates.

*Conversion of N-hexene to aromatics*

[Sodium alumino-silicate catalyst; atm. pressure]

| Test Number | 392 | 393 | 394 |
|---|---|---|---|
| Temperature, °F | 245 | 400 | 400 |
| Feed, v./v./Hr | 0.1 | 0.1 | 0.1 |
| Effluent, Unconverted Hexene [1]: | | | |
|   Vol./100 vols. of catalyst | 2.6 | 2.6 | 25.6 |
|   Percent of Feed | 21.9 | 28.9 | 78.7 |
| Desorbate (Reaction Products): | | | |
|   Percent of Feed | 78.1 | 71.1 | 21.3 |
| Properties of Fractions: | | | |
|   Percent Having RI below 1.425 | 100 | 56 | 0 |
|   Percent Having RI 1.425–1.475 | 0 | 35 | 65 |
|   Percent Having RI Above 1.475 | 0 | 9 | 35 |

[1] Also includes small amounts of hexane present in feed and some low-boiling reaction product.

The above data show that temperatures as low as 245° F. are not satisfactory for the conversion to aromatics since the products of the reaction had a refractive index of 1.390–1.410 as compared to 1.384 for the hexene feed. At 400° F. the conversion to aromatic products is higher, as shown by the increased quantities of high refractive index products. The concentration of the aromatic products on the catalyst-adsorbent before recovery by desorption with steam was considerably increased in test 394 (as compared to test 393) by contacting with a larger proportion of hexene feed, 35% having refractive index above 1.475. The intermediate conversion products would be suitable for recycle.

EXAMPLE IV

The conversion of n-heptene to aromatic concentrates was accomplished as in Example I with a sodium alumino-silicate at atmospheric pressure, a feed rate of 0.06 v./v./hr., and a temperature of 400° F. After producing 10 vols. of effluent/100 vols. of catalyst, the adsorbed aromatic concentrate was recovered by steam desorption and amounted to 50% of the heptene feed. This product contained 29.1% of a fraction having a refractive index of 1.480. The 70.9% of intermediate fractions (refractive index 1.416–1.434) could be extracted to yield additional aromatics or recycled for further conversion.

The foregoing description contains a limited number of embodiments of the present invention. It will be understood that the present invention is not limited thereto since numerous variations are possible without departing from the scope of the following claims.

What is claimed is:

1. A process for the production of aromatics which comprises contacting a feed consisting essentially of aliphatic olefinic hydrocarbons containing from 2 to 7 carbon atoms per molecule with an adsorbent consisting of a crystalline alumino-silicate zeolite having pore openings above about 6 A. as the only catalytic agent at temperatures of from about 350° to 850° F. for a period sufficient to convert the olefinic hydrocarbons into aromatics.

2. A process for the production of aromatics which comprises contacting a feed consisting essentially of aliphatic olefinic hydrocarbons containing from 2 to 7 carbon atoms per molecule with an adsorbent consisting of a crystalline alumino-silicate zeolite having pore openings of about 13 A. as the only catalytic agent at temperatures of from about 350° to 850° F. for a period sufficient to convert the olefinic hydrocarbons into aromatics.

3. A process for the production of aromatics which comprises contacting a feed consisting essentially of aliphatic olefinic hydrocarbons containing from 2 to 7 carbon atoms per molecule with an adsorbent consisting of a crystalline alumino-silicate zeolite having pore openings above about 6 A. as the only catalytic agent at temperatures of from about 350° to 850° F., and at pressures of up to about 500 p.s.i.g. for a period sufficient to convert the olefinic hydrocarbons into aromatics.

4. A process for the production of aromatics which comprises contacting a feed consisting essentially of aliphatic olefinic hydrocarbons containing from 2 to 7 carbon atoms per molecule with an adsorbent consisting of a crystalline alumino-silicate zeolite having pore openings of about 13 A. as the only catalytic agent at temperatures of from about 350° to 850° F., and at pressures of up to about 500 p.s.i.g. for a period sufficient to convert the olefinic hydrocarbons into aromatics.

5. A process for the production of aromatics which comprises contacting a feed consisting essentially of aliphatic olefinic hydrocarbons containing from 2 to 7 carbon atoms per molecule with an adsorbent consisting of a crystalline alumino-silicate zeolite having pore openings above about 6 A. which has been base exchanged with a salt of a metal which promotes the formation of aromatics as the only catalytic agent, at temperatures of from about 350° to 850° F., and at pressures of up to about 500 p.s.i.g. for a period sufficient to convert the olefinic hydrocarbons into aromatics.

6. A process for the production of aromatics which comprises contacting a feed consisting essentially of aliphatic olefinic hydrocarbons containing from 2 to 7 carbon atoms per molecule with an adsorbent consisting of a crystalline alumino-silicate zeolite having pore openings of about 13 A. which has been base exchanged with a salt of a metal which promotes the formation of aromatics as the only catalytic agent, at temperatures of from about 350° to 850° F., and at pressures of up to about 500 p.s.i.g. for a period sufficient to convert the olefinic hydrocarbons into aromatics.

7. A process for the production of aromatics which comprises contacting a feed consisting essentially of aliphatic olefinic hydrocarbons containing from 2 to 7 carbon atoms per molecule with an adsorbent consisting of a crystalline alumino-silicate zeolite having pore openings of about 13 A. as the only catalytic agent at temperatures of from about 350° to 850° F., continuing to charge the olefinic feed to the zeolite until the latter is substantially saturated with aromatics, desorbing the aromatics from the zeolites and contacting further quantities of the olefinic feed with the zeolites under said conversion conditions.

8. A process for the production of aromatics which comprises contacting a feed consisting essentially of aliphatic olefinic hydrocarbons containing from 2 to 7 carbon atoms per molecule with an adsorbent consisting of a crystalline alumino-silicate zeolite having pore openings of about 13 A. as the only catalytic agent at temperatures of from about 350° to 850° F., and at pressures of up to about 500 p.s.i.g., continuing to charge the olefinic feed to the zeolite until the latter is substantially saturated with aromatics, desorbing the aromatics from the zeolites and contacting further quantities of the olefinic feed with the zeolites under said conversion conditions.

9. A process for the production of aromatics which comprises contacting a feed consisting essentially of aliphatic olefinic hydrocarbons containing from 2 to 7 carbon atoms per molecule with an adsorbent consisting of a crystalline alumino-silicate zeolite having pore openings of about 13 A. which has been base exchanged with a salt of a metal which promotes the formation of aromatics as the only catalytic agent, at temperatures of from about 350° to 850° F., and at pressures of up to about 500 p.s.i.g., continuing to charge the olefinic feed to the zeolite until the latter is substantially saturated with aromatics, desorbing the aromatics from the zeolites and contacting further quantities of the olefinic feed with the zeolites under said conversion conditions.

(References on following page)

References Cited in the file of this patent

UNITED STATES PATENTS

| | | | |
|---|---|---|---|
| 2,212,035 | Morrell et al. | Aug. 20, | 1940 |
| 2,375,402 | Corson et al. | May 8, | 1945 |
| 2,378,057 | Yarnall | June 12, | 1945 |
| 2,508,014 | Davidson | May 16, | 1950 |
| 2,574,434 | Greentree | Nov. 6, | 1951 |
| 2,681,304 | Blanding et al. | June 15, | 1954 |
| 2,834,429 | Kinsella et al. | May 13, | 1958 |